United States Patent
Lu et al.

(10) Patent No.: US 12,284,669 B2
(45) Date of Patent: Apr. 22, 2025

(54) RESOURCE INDICATION AND SELECTION SCHEMES IN WIRELESS COMMUNICATION

(71) Applicant: ZTE Corporation, Guangdong (CN)

(72) Inventors: Youxiong Lu, Guangdong (CN); Weimin Xing, Guangdong (CN); Jin Yang, Guangdong (CN)

(73) Assignee: ZTE Corporation, Guangdong (CN)

( * ) Notice: Subject to any disclaimer, the term of this patent is extended or adjusted under 35 U.S.C. 154(b) by 550 days.

(21) Appl. No.: 17/381,890

(22) Filed: Jul. 21, 2021

(65) Prior Publication Data

US 2021/0352710 A1    Nov. 11, 2021

Related U.S. Application Data

(63) Continuation of application No. PCT/CN2019/072536, filed on Jan. 21, 2019.

(51) Int. Cl.
*H04W 74/00* (2009.01)
*H04W 28/02* (2009.01)
*H04W 28/26* (2009.01)
*H04W 72/20* (2023.01)

(52) U.S. Cl.
CPC ..... *H04W 74/002* (2013.01); *H04W 28/0268* (2013.01); *H04W 28/26* (2013.01); *H04W 72/20* (2023.01)

(58) Field of Classification Search
CPC ........... H04W 74/002; H04W 28/0268; H04W 28/26; H04W 72/20; H04W 72/02; H04L 5/0007; H04L 5/0044
See application file for complete search history.

(56) References Cited

U.S. PATENT DOCUMENTS

| 10,887,736 B2* | 1/2021 | Lee ........................ H04W 72/02 |
| 11,844,058 B2* | 12/2023 | Lin ......................... H04W 76/14 |
| 2020/0112872 A1* | 4/2020 | Nimbavikar .......... H04L 47/805 |
| 2020/0154404 A1* | 5/2020 | Göktepe ................ H04L 1/1812 |
| 2020/0178256 A1* | 6/2020 | Tang .................. H04W 72/0453 |

(Continued)

FOREIGN PATENT DOCUMENTS

| CN | 106612561 A | 5/2017 |
| CN | 107734548 A | 2/2018 |

(Continued)

OTHER PUBLICATIONS

European Search Report for EP Patent Application No. 19849734.9, dated Jul. 11, 2022, 10 pages.

(Continued)

*Primary Examiner* — John D Blanton
(74) *Attorney, Agent, or Firm* — Perkins Coie LLP

(57) ABSTRACT

Methods, systems, and devices for resource indication and selection schemes in wireless communication are described. In one aspect, a wireless communication method is provided to include: performing, by a first device, a first communication of a resource pre-occupation information (RPI) with a second device using a dedicated resource pre-occupied channel or control channel, and wherein when a pre-occupied resource is transmitted at a time 'n,' the first communication is performed i) before a time 'n-X,' wherein X is an integer not less than 0, or ii) during a time window ending before the time 'n.'

21 Claims, 12 Drawing Sheets

Performing a first communication of a resource pre-occupation information

(56) References Cited

U.S. PATENT DOCUMENTS

| | | | |
|---|---|---|---|
| 2020/0196310 A1* | 6/2020 | Tang | H04W 4/70 |
| 2020/0374859 A1* | 11/2020 | Han | H04W 72/02 |
| 2020/0383088 A1* | 12/2020 | Min | H04W 72/0453 |
| 2021/0160778 A1* | 5/2021 | Ji | H04W 52/0229 |
| 2021/0219292 A1* | 7/2021 | Wang | H04W 72/0453 |
| 2021/0243749 A1* | 8/2021 | Hoang | H04W 24/08 |
| 2021/0250913 A1* | 8/2021 | Ganesan | H04W 76/14 |
| 2021/0251023 A1* | 8/2021 | Phan | H04W 4/70 |
| 2021/0306824 A1* | 9/2021 | Li | H04W 4/40 |
| 2021/0307032 A1* | 9/2021 | Osawa | H04W 72/569 |
| 2021/0352710 A1* | 11/2021 | Lu | H04L 5/0044 |
| 2021/0392618 A1* | 12/2021 | Hedayat | H04W 72/30 |
| 2021/0392707 A1* | 12/2021 | Do | H04W 72/02 |
| 2022/0006569 A1* | 1/2022 | Lee | H04W 72/02 |
| 2022/0007339 A1* | 1/2022 | Li | H04W 4/40 |
| 2022/0053496 A1* | 2/2022 | Yu | H04W 72/20 |
| 2022/0104238 A1* | 3/2022 | Aiba | H04W 72/20 |
| 2022/0109527 A1* | 4/2022 | Hwang | H04L 1/1864 |
| 2022/0124562 A1* | 4/2022 | Yu | H04W 72/20 |
| 2023/0055127 A1* | 2/2023 | Li | H04W 80/02 |
| 2023/0232422 A1* | 7/2023 | Lee | H04L 5/0053 370/329 |
| 2023/0379102 A1* | 11/2023 | Basu Mallick | H04L 1/08 |
| 2023/0379889 A1* | 11/2023 | Rudolf | H04L 12/1863 |

FOREIGN PATENT DOCUMENTS

| | | | |
|---|---|---|---|
| EP | 2768182 A1 | 8/2014 | |
| EP | 3445130 A1 * | 2/2019 | H04W 28/16 |
| EP | 3468268 A1 | 4/2019 | |
| KR | 10-2019-0000891 A | 1/2019 | |
| WO | 2018103100 A1 | 6/2018 | |

OTHER PUBLICATIONS

Interdigital Inc., "Resource Allocation for NR V2X," 3GPP RAN WG1 Meeting #95, R1-1813164, Spokane, USA, Nov. 12-16, 2018, 9 pages.

International Search Report and Written Opinion mailed on Oct. 11, 2019 for International Application No. PCT/CN2019/072536, filed on Jan. 21, 2019 (6 pages).

EPO, Communication pursuant to Article 94(3) EPC for European Application No. 19849734.9, mailed on Feb. 22, 2024, 8 pages.

* cited by examiner

RESOURCE INDICATION AND SELECTION SCHEMES IN WIRELESS COMMUNICATION

CROSS-REFERENCE TO RELATED APPLICATIONS

This application is a continuation of International Patent Application No. PCT/CN2019/072536, filed on Jan. 21, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for resource indication and selection schemes in wireless communication. Some implementations of the disclosed technology provide an improved flexibility to meet the need for more various communication scenarios and achieve low latency and high reliability.

In one aspect, a wireless communication method is provided to include: performing, by a first device, a first communication of a resource pre-occupation information (RPI) with a second device using a dedicated resource pre-occupied channel or control channel, and wherein when a pre-occupied resource is transmitted at a time 'n,' the first communication is performed i) before a time 'n-X,' wherein X is an integer not less than 0, or ii) during a time window ending before the time 'n.' In another aspect, a wireless communication apparatus comprising a processor configured to perform the disclosed methods is disclosed.

In another aspect, a wireless communication method is provided to include: receiving, by a user device, at least one of a pre-occupied resource indication information or control information including resource pre-occupation information (RPI); and monitoring, by the user device, the resource pre-occupation information (RPI) during a monitoring window to obtain a usage of a resource indicated in the resource pre-occupation information (RPI).

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

DETAILED DESCRIPTION

Figure 1:
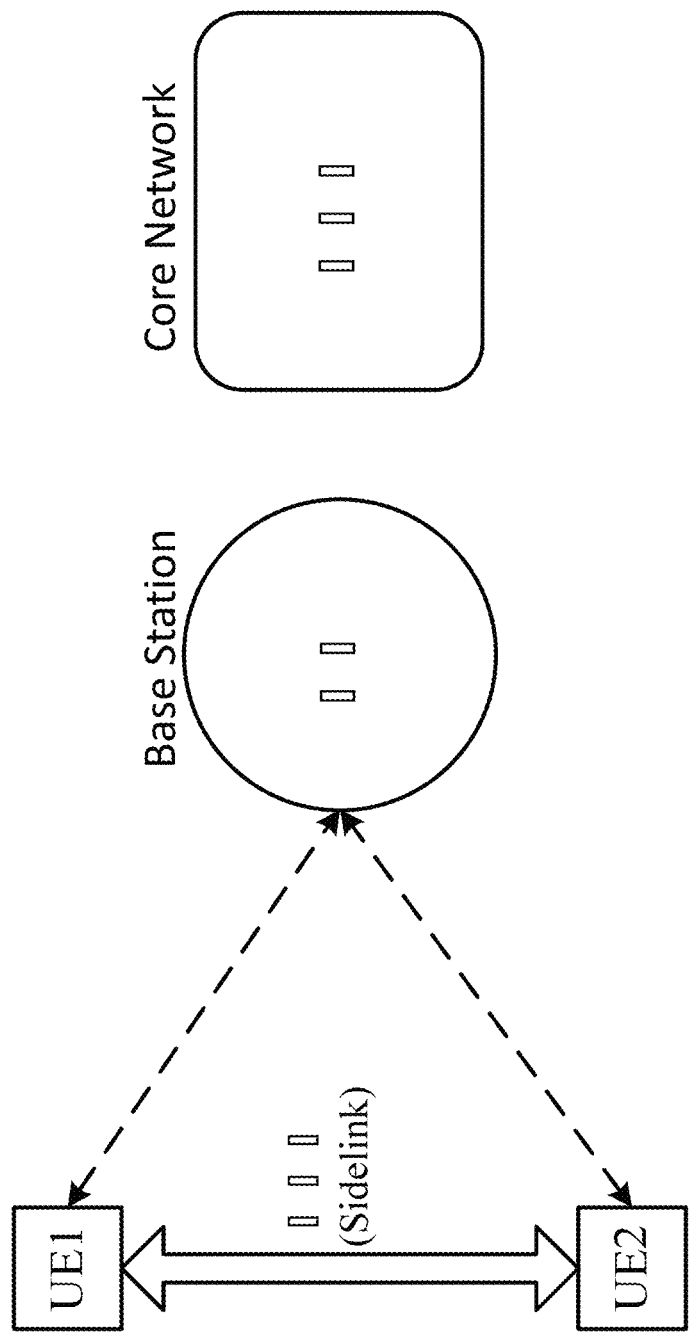
FIG. 1 shows an example of a block diagram illustrating a side-link communication system.

As wireless communication technologies change almost every day, applications in various vertical fields are booming. In order to meet the increasing communication needs, the 5th generation mobile communication (5G, 5th Generation) technology and the further enhancements based on 5G become the development trend for future wireless communications. FIG. 1 shows an example of a block diagram illustrating a side-link communication (Sidelink communication) system. As shown in FIG. 1, when there is a service between the user equipments (UEs), the service data between the UEs may not be transmitted through the network side. Rather, the service between the UEs is directly sent through the Sidelink from the source UE to the target UE. The sidelink communications (e.g., D2D, V2X, etc.) can work in a variety of scenarios including network coverage, partial network coverage, and no coverage. The sidelink communications can reduce the burden on the cellular network, reduce the battery power consumption of the user equipment, increase the data rate, and improve the robustness of the network infrastructure, which satisfies the requirements of high data rate services and proximity services. The sidelink communications also supports the direct communications under the network coverage scenario can meet the communication needs of public safety and car networking.

Figure 2:
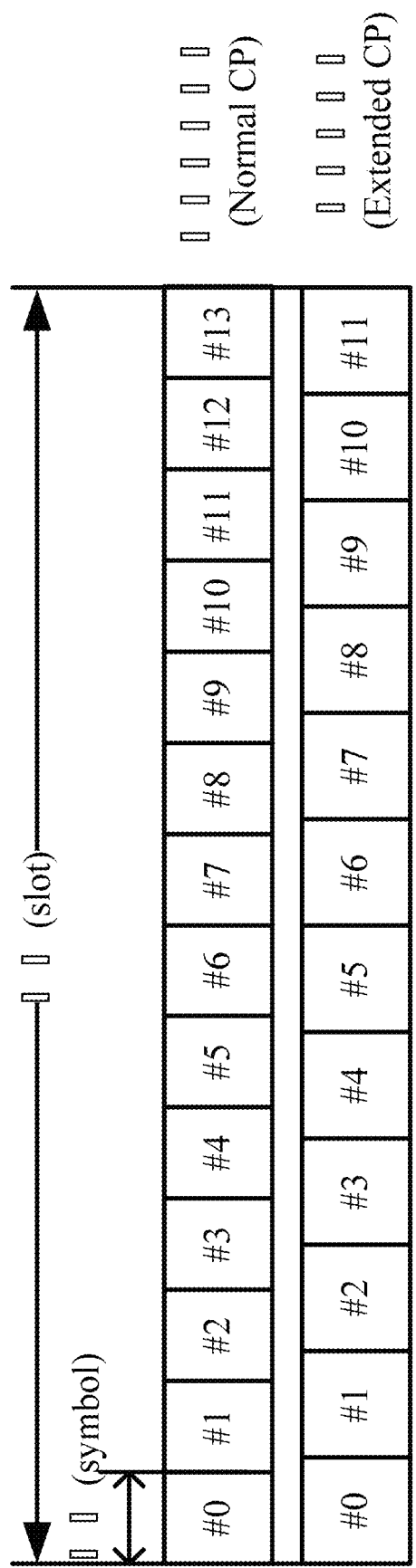
FIG. 2 shows examples of normal CP and extended CP in an NR system.
Figure 3:
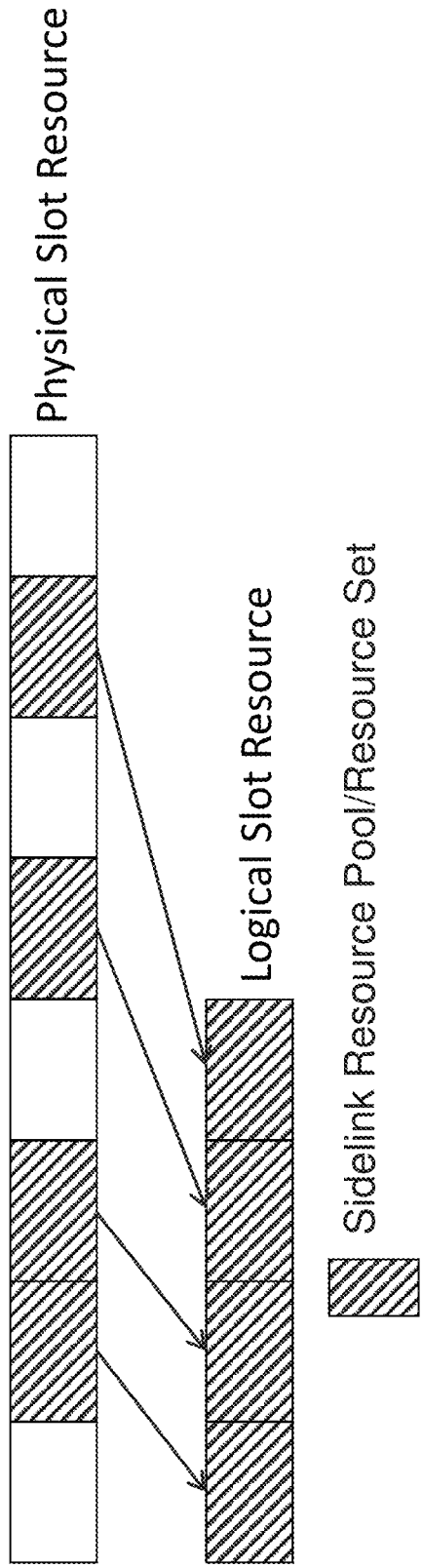
FIG. 3 shows a mapping of sidelink resources between a physical slot resource between a logical slot resource.

FIG. 2 shows examples of normal CP and extended CP in an NR system. As shown in FIG. 2, in the NR system, 14 symbols (Normal CP) are included in a slot and 12 symbols (Extended CP) are included in the slot. The sidelink resource pool/resource set can be configured by a system message. Alternatively, the sidelink resource pool/resource set can be configured or pre-configured with a dedicated signaling. In the time domain, the sidelink resource can be mapped on the physical sub-frame/physical slot resource or mapped in the time domain position of the logical sub-frame/logical slot resource, as shown in FIG. 3. On the physical sub-frame/physical slot resource, some slot resources are configured as sidelink resources, as shown with diagonal lines in FIG. 3.

The resource indication or resource selection can also be mapped to the time domain location of the physical sub-frame/physical slot resource. When the resource indication or resource selection is for a sidelink resource, it can be used for the sidelink communication. The sidelink logical sub-frame/logical slot resource includes consecutive numbers of sidelink resource slots. Resource indications or resource selections may also be mapped at time domain locations of logical sub-frames/logical slot resources.

In the 5G communication systems, for example, NR Vehicle-to-Everything (V2X), two modes, i.e., a base station resource scheduling mode and a UE autonomous resource selection mode, are supported. The examples of the base station resource scheduling mode include Mode 1 in D2D, Mode 3 in LTE V2X, Mode 1 in NR V2X and the examples of the UE autonomous resource selection mode include Mode 2 in D2D, Mode 4 in LTE V2X, and Mode 2 in NR V2X. In addition, NR V2X supports multiple service types including periodic service types and aperiodic service types. To perform the autonomous resource selection, the UE needs to measure or sense resource usage in a resource pool to select available resources. For aperiodic service types in which the transmission is not periodic, there is no fixed transmission period of the transmission at the physical layer, so that available resources cannot be obtained using existing mechanisms. Thus, there is a need for a new resource selection mechanism which can meet the NR V2X resource selection and reduce the conflicts of resource selections between UEs. In the recognition of the limitations of the existing mechanisms, the disclosed technology provides various implementations of the resource indication and selection mechanisms which can support more various applications in future communications. Some implementations of the disclosed technology propose a resource selection method and a pre-occupied resource indication method which reduce resource conflicts when the UE independently selects resources (Mode 2 in NR V2X). Some implementations of the disclosed technology can improve transmission reliability and ensure the reliable transmission of services having different priorities. The various implementations can be carried out at a user device in wireless communication system.

Figure 4:
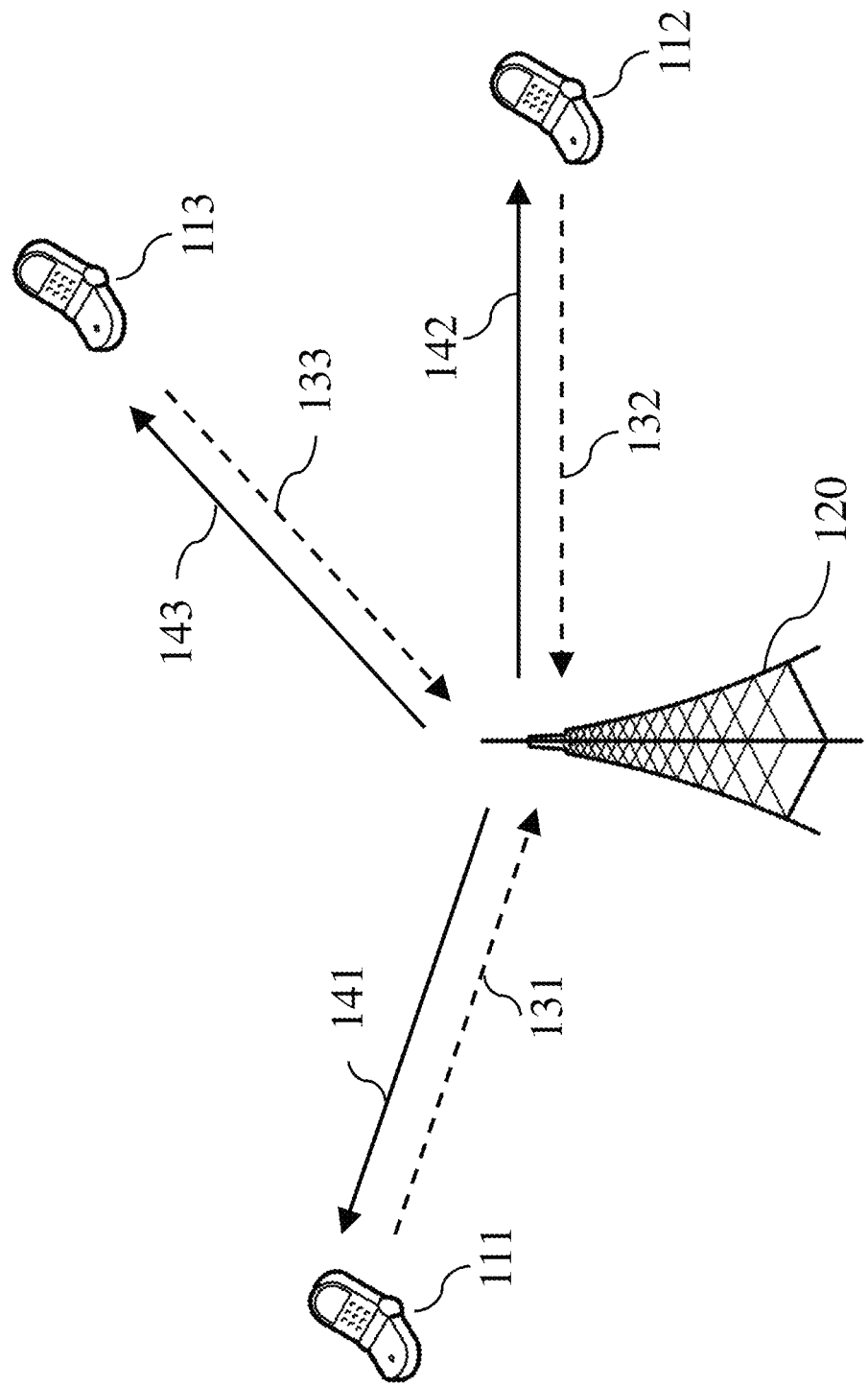
FIG. 4 shows an example of a base station (BS) and a user equipment (UE) in wireless communication based on some implementations of the disclosed technology.

FIG. 4 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 5:
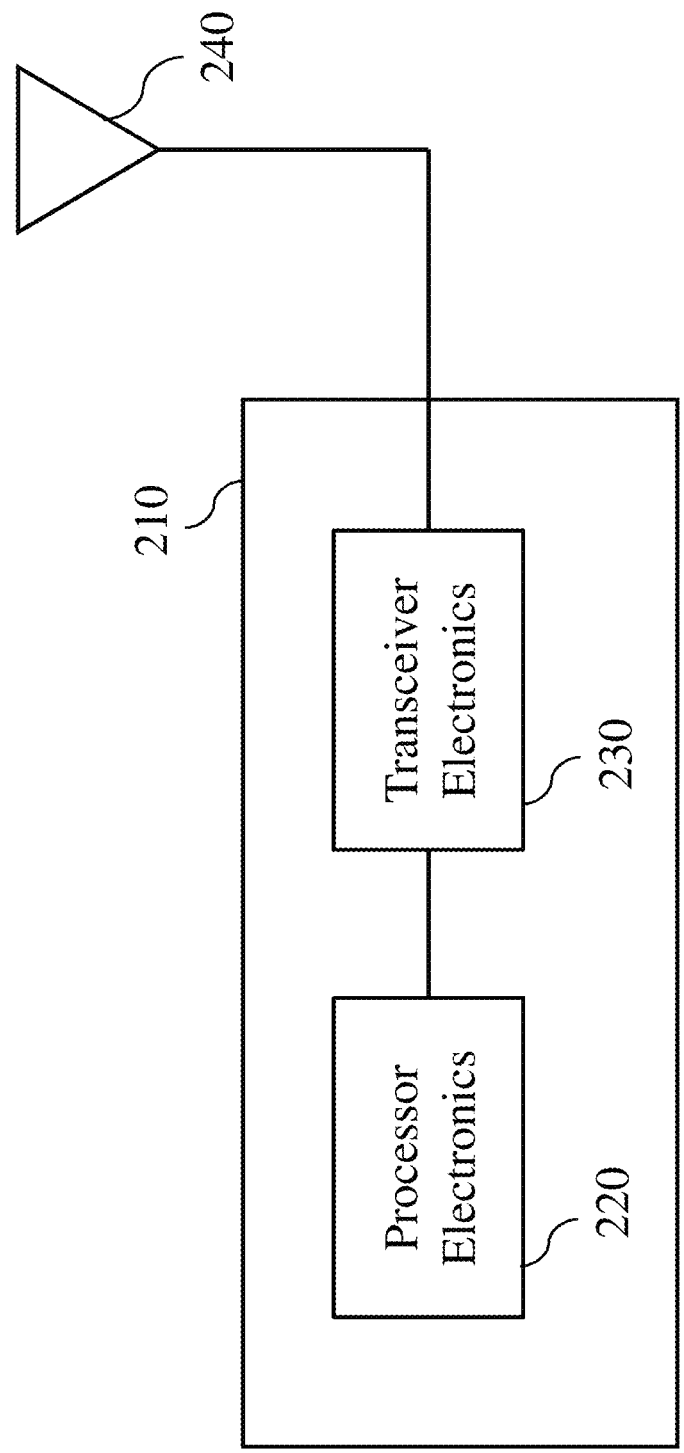
FIG. 5 shows an example of a block diagram of a portion of an apparatus based on some implementations of the disclosed technology.

FIG. 5 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

In the below, features and implementations suggested for the pre-occupied resource indication scheme and the resource selection scheme are discussed. Section headings are used in the present document only to facilitate ease of understanding and scope of the embodiments and techniques described in each section are not only limited to that section. Furthermore, while 5G terminology is used in some cases to facilitate understanding of the disclosed techniques, which may be applied to wireless systems and devices that use communication protocols other than 5G or 3GPP protocols.

Pre-Occupied Resource Indication Scheme (Sender)

Figure 6:
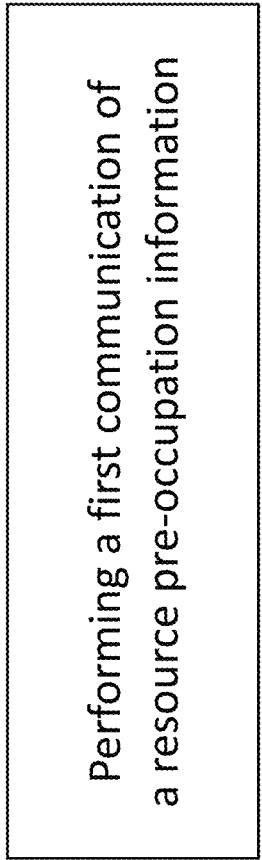
FIG. 6 shows an example of a pre-occupied resource indication scheme based on some implementations of the disclosed technology.

FIG. 6 shows an example of a pre-occupied resource indication scheme based on some implementations of the disclosed technology. The example of the pre-occupied resource indication scheme includes performing a first communication of a resource pre-occupation information (RPI), wherein when a pre-occupied resource is transmitted at a time 'n,' the first communication is performed i) before a time 'n-X,' wherein X is an integer not less than 0, or ii) during a time window ending before the time 'n.'

For the sidelink transmission Mode 2, if the higher layer indicates (in a configured sidelink grant) to the UE to transmit sidelink data, for example, sidelink control and/or data (PSCCH and/or PSSCH) at time 'n,' then BS sends resource pre-occupied information before time 'n' or in a time window before time 'n.' Before the time 'n' means that the transmission time 'k' of the resource pre-occupation information (RPI) is before the timing, 'n-X.' In some implementations, the transmission time of the resource pre-occupation information (RPI) is 'k.' The time unit can be or include a slot, a sub-frame, a symbol, or an aggregated slot unit. In some implementations, 'X' is an integer not less than 0 and may have a predefined value. The value of 'X' may be determined by at least one of the following: i) the priority level corresponding to the data transmitted at time 'n'; ii) the reliability level corresponding to the data transmitted at time 'n'; iii) the delay requirement corresponding to the data transmitted at time 'n'; iv) the QoS (quality of service level, such as 5QI, VQI) level corresponding to the data transmitted at time 'n'; or v) the busyness of the current resource pool, such as CBR (Channel Busy Ratio). The time window is referred to as a pre-occupation information transmission window, referred to as a PW window, and the transmission time 'k' of the pre-occupation information is within the range of the PW window. The PW window is determined by the start position Tw1 and the end position Tw2. The time unit can be a slot, a sub-frame, a symbol, or an aggregated slot unit.

For sidelink transmission Mode 1, the UE receives the DCI indicated by the base station at time 'm.' The DCI may indicate at least one of the priority level, the reliability level, the delay request, or the QoS (quality of service level, such as 5QI, VQI) level. After the UE receives the DCI at time 'm,' the UE determines to transmit sidelink control and/or data (PSCCH and/or PSSCH) at time 'n.' Then, the BS transmits the resource pre-occupation information (RPI) before time 'n' or in a time window before time 'n.' The meaning of before time 'n' and the meaning of being in a time window before time 'n' is same as explained for the sidelink transmission Mode 2. The resource pre-occupation information (RPI) transmission time is 'k.'

In some implementations, the resource pre-occupation information (RPI) includes at least one of the following:

1. Time domain resource indication (time domain location) of a resource such as the PSSCH/PSCCH transmission time 'n,' an offset for the deviation between the time domain location of the pre-occupied resource and the transmission time of the resource pre-occupation information (RPI), information of multiple time domain locations n1, n2, . . . , or offset 1, offset 2, . . . or pattern, or an index value of the time domain deviation.
2. Frequency domain resource indication of a resource (frequency domain location, size), such as a RIV (Resource Indicator Value) of the frequency domain location of the resource used by the PSSCH/PSCCH.
3. Priority indication. In some implementation, the value of the priority indication filed is determined according to the priority corresponding to the transport block, or determined by the priority indicated by a high layer, or determined by the priority indicated by the DCI.
4. QoS parameter indication. In some implementations, the value of QoS parameter indication filed is determined according to a QoS parameter corresponding to the transport block (such as 5QI or VQI), or derived from at least one of the following parameters: PPPP (ProSe Per-Packet Priority), PDB (Packet Delay Budget), PPPR (ProSe Per-Packet Reliability), data rate and required communication range, or determined by a QoS parameter indicated by the DCI.
5. Resource location retransmission information. This resource location retransmission information indicates time and/or frequency domain location information of a resource transmitted multiple times.
6. Indication type information. This indication type information indicates whether the current pre-occupation information indicates the transmission of the current PSSCH.
7. Destination ID. The destination ID indicates who needs to receive the slot.
8. Active or release Indication. If the pre-occupied resource is to be released, the resource pre-occupation information (RPI) can be used to release the pre-occupied resource.

The indication type information may include at least one of the following:

i) Indication type field. Indication type filed may have a value of 1 bit. The number '0' indicates format 1 that a transmission of a pre-occupied resource is not associated with the PSSCH transmission; and the number '1' indicates format 2 that the transmission of the pre-occupied resource is associated with the PSSCH transmission. In some implementations, the number '0' and '1' can be set to indicate the opposite such that the number '0' of the indicate type field indicates format 2 and the number '1' of the indication type field indicates the format 1.
ii) Modulation and coding domain indication. A specific value is used to indicate that there is no associated PSSCH transmission. Otherwise, it indicates that there is an associated PSSCH transmission.
iii) Transmission indication of the pre-occupied resource. In some implementations, the implied transmission indication allows to use a dedicated resource set or resource pool of pre-occupied resource information other than the PSSCH resource set or resource pool, which indicates that there is no associated PSSCH transmission. In some implementations, the implied transmission indication allows to use a PSCCH resource or resource pool, which indicates that there is an associated PSSCH transmission.

The resource pre-occupation information (RPI) may be sent on a dedicated resource pre-occupied channel or carried on the PSCCH.

In some implementations, the time domain range of the PW window may include [Tw1, Tw2], or (Tw1, Tw2), or (Tw1, Tw2], or [Tw1, Tw2); or [n-X1, n-X2], or (n-X1, n-X2), or (n-X1, n-X2], or [n-X1, n-X2). The parameters, Tw1, Tw2, X1, and X2, can be pre-configured, or at least determined according to one of the following: i) the priority level corresponding to the data transmitted at time n; ii) the reliability level corresponding to the data transmitted at time n; iii) the delay requirement corresponding to the data transmitted at time n; iv) the QoS (quality of service level, such as 5QI, VQI) level corresponding to the data transmitted at time n; or v) the busyness of the current resource pool, such as CBR.

The resource pre-occupation information (RPI) may be sent during the PW window, or the resource pre-occupied information may be sent before the time n. In some implementations, the resource set or resource pool used by the resource pre-occupation information (RPI) may be configured. In some implementations, a pattern or rule for the transmission of the resource pre-occupation information (RPI) may be configured or predefined. The pattern refers to a location rule of a plurality of resources that are pre-occupied with the resource pre-occupation information (RPI). The rule may be determined based on at least one of correspondence between the number N indicating the number of times that the pre-occupation information is transmitted and the priority or QoS parameters, or correspondence between the time 'n-X' for the resource pre-occupation information (RPI) transmission and priority or QoS parameters, or correspondence between the time domain range [Tw1, Tw2] of the PW window and priority or QoS parameters. In some implementations, the UE may select N resources in the time domain before the time 'n-X' for transmitting the resource pre-occupation information (RPI). Alternatively, the UE may select N resources in the PW window for transmitting the resource pre-occupation information (RPI). In some implementations, the UE selects N resources for transmitting pre-occupation information according to a predefined pattern or rule within the PW window.

Resource Selection Scheme (Receiver)

Figure 7:
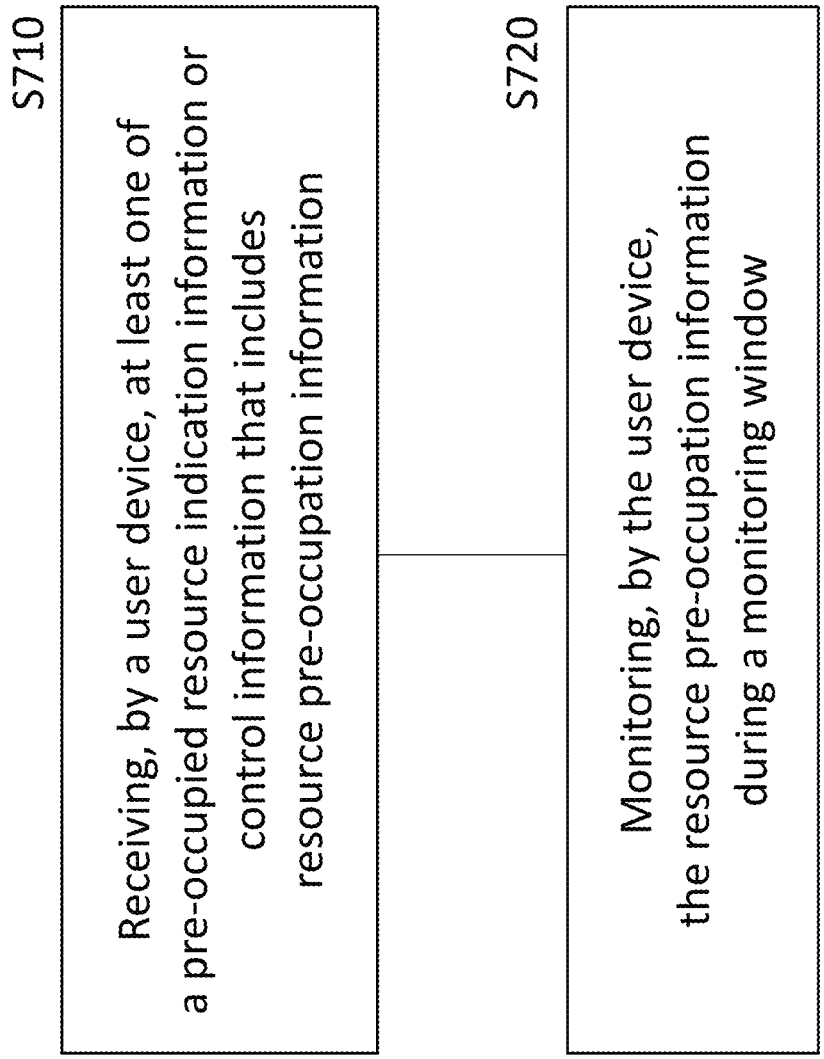
FIG. 7 shows an example of a resource selection scheme based on some implementations of the disclosed technology.

FIG. 7 shows an example of a resource selection scheme based on some implementations of the disclosed technology. At 710, the user device receives at least one of a pre-occupied resource indication information or control information that includes resource pre-occupation information (RPI). At 720, the user device monitors the resource pre-occupation information (RPI) during a monitoring window to obtain a usage of a resource which is indicated in RPI. More detailed operations for the resource selection scheme are discussed below.

If the upper layer requests to report a measurement/sensing result at a time t for the transmission for PSCCH/PSSCH, at least one of the following operations may be performed in a resource pool.

1. The UE may determine a resource selection window RW with a range such as [t+T1, t+T2]. All resources in the RW are used as candidate resources C-set. The number of resource units included in the RW is N. The resource unit can be 1 PRB, or multiple PRB combinations.

2. The UE may receive, from another UE(s), pre-occupied resource indication information and/or control information carrying resource pre-occupation information (RPI). The received information may be decoded by the UE. The resource usage is counted during a monitoring window SW or before the cutoff time Th. The pre-occupied resource indication information and/or control information can provide information on the resource that has been pre-occupied by another UE and/or the resource to be used by the UE. The resource indicated by the received information as one that has been pre-occupied is excluded from the C-set and collected in an O-Set. The excluding of a particular resource from the C-set can be carried out in other ways. For example, the resource can be excluded from the C-set when there is an overlap between a resource pre-occupied by another user device and a resource to be used by the user device, excluding the resource from the candidate resource set. In some implementations, the resource is excluded from the C-set when there is an overlap between the resource pre-occupied by another user device and the resource to be used by the user device, and a priority level or a QoS parameter level indicated for another user device is higher than that for the user device. In some implementations, when there is an overlap between the resource pre-occupied by another user device and the resource to be used by the user device, and the priority level or the QoS parameter level indicated for another user device is equal to the user device, excluding the resource from the candidate resource set whose power (RSRP, Reference Signal Received Power) or signal strength (RSSI, Received Signal Strength Indicator) of the resource pre-occupation information (RPI) is higher than a threshold. In some implementations, when there is the resource pre-occupied by another user device and a destination ID in its resource pre-occupation information (RPI) is for the user device, excluding the resource on a same time domain of the pre-occupied resource from the candidate resource set.
3. The remaining resources are treated as selectable resources S-Set.
4. The UE may check whether resources in the S-Set meet the minimum resource requirement. For example, the minimum resource quantity ratio P is 10%.
5. If the resources in the S-Set are less than the minimum resource quantity requirement (floor(N*P) or ceil (N*P)), the UE sorts the resource units in the O-set (used resource set) from low priority to high priority. When the priorities between some of the resource units are the same, those resource units are sorted based on the energy corresponding to the pre-occupied signals from small to large. The resources which meet the condition, for example, the lowest priority and/or minimum energy, are sequentially moved into the S-set until the S-set meets the minimum number requirement. In some implementations, the condition is satisfied when the priority level of a resource is lower than the priority level of the corresponding PSSCH sent by the resource.
6. If the minimum resource quantity requirement is still not met, the UE reports to the upper layer no available resource.
7. If the minimum resource quantity requirement is met, the UE reports resources in the S-Set that is required by the number threshold to the upper layer.

The resource selection window RW is set, for example, as [t+T1, t+T2], where T1 and T2 are integers greater than or equal to 0. The range limits of T1 minimum (T1mini, T1>T1mini) and T2maximum (T2max, T2<T2max) need to be met. The specific value can be determined by the UE. The T1mini can be predefined or determined based on priority levels or QoS parameters. The T2max can be predefined, or determined based on the maximum latency requirement, or based on priority levels or QoS parameters.

The monitoring window SW is set, for example, as [t-S1, t-S2], where S1 and S2 are integers greater than or equal to 0. The range limits of S1maximum (S1max, S1≤S1max) and S2minimum (S2mini, S2>S2mini) need to be satisfied. The specific value can be determined by the UE. The S1max can be predefined or determined based on priority levels or QoS parameters. The S2mini can be predefined or determined based on priority levels or QoS parameters.

The cutoff time Th is set, for example, as (t-S), where S is an integer greater than or equal to 0. The range limit of Sminimum (Smini, S>Smini) needs to be satisfied. The specific value can be determined by the UE. The S1mini can be predefined or determined based on priority levels or QoS parameters.

In some implementations, the resource selection method may provide various implementations for a resource reselection scheme. Examples of the resource reselection scheme are discussed in the below.

Resource Reselection Scheme 1

Resource reselection scheme 1 may be performed to include at least one of the following operations:
1. The UE may receive, from another UE(s), the resource pre-occupation information (RPI). The received information may be decoded by the UE. The resource pre-occupation information (RPI) indicates a resource pre-occupied by another UE(s).
2. If there is an overlap between a resource pre-occupied by another UE(s) and a resource which is to be used by itself and is indicated by its resource pre-occupation information (RPI), the priority level or QoS parameter level of the overlapped resources is compared.
3. If the comparison shows that the priority of another UE(s) is higher than the priority of the UE, the resource reselection is triggered. In this case, the UE reselects a new resource for the transmission.
4. If the comparison shows that the priority of another UE(s) is not higher than the priority of the UE, the transmission of its pre-occupied resource is continued.

Resource Reselection Scheme 2

Resource reselection scheme 2 may be performed to include at least one of the following operations:
1. The UE may receive resource pre-occupation information (RPI) sent by another UE(s) and/or control information carrying resource pre-occupation information (RPI). The received information may be decoded by the UE. The resource pre-occupation information (RPI) indicates a resource pre-occupied by another UE(s).
2. If there is an overlap between a resource pre-occupied by another UE(s) and the resource to be used by the UE, the resource reselection is triggered. In this case, the UE reselects a new resource for the transmission.

Resource Reselection Scheme 3

Resource reselection scheme 3 may be performed to include at least one of the following operations:
1. The UE may receive resource pre-occupation information (RPI) sent by another UE(s). The received information may be decoded by the UE. The resource pre-occupation information (RPI) indicates a resource pre-occupied by another UE(s).

2. If i) there is an overlap between a resource pre-occupied by another UE(s) and the resource to be used by the UE and ii) the CBR of the current resource pool is lower than the preset or configured threshold, the resource reselection is triggered to reselect a new resource for the transmission. If the CBR of the current resource pool is not lower than the preset or configured threshold, the priority level or QoS parameter level of the two overlapping resources is compared.
3. If the comparison shows that the priority of another UE(s) is higher than the priority of the UE, the resource reselection is triggered. In this case, the UE reselects a new resource for the transmission.
4. If the comparison shows that the priority of another UE(s) is not higher than the priority of the UE, the transmission of the pre-occupied resource is continued.

The time domain resource described here may have a time domain resource including a slot, a subframe, a symbol, or an aggregated slot unit. The time relationship may be mapped on a physical time unit or only on a logical time unit.

The disclosed technology can be implemented in various manners to provide the pre-occupied resource indication scheme and the resource indication scheme. Some implementations are discussed in more detail in the below as examples of the disclosed technology.

Implementation 1 (Pre-occupied Resource Indication Scheme, Mode 2)

Figure 8:
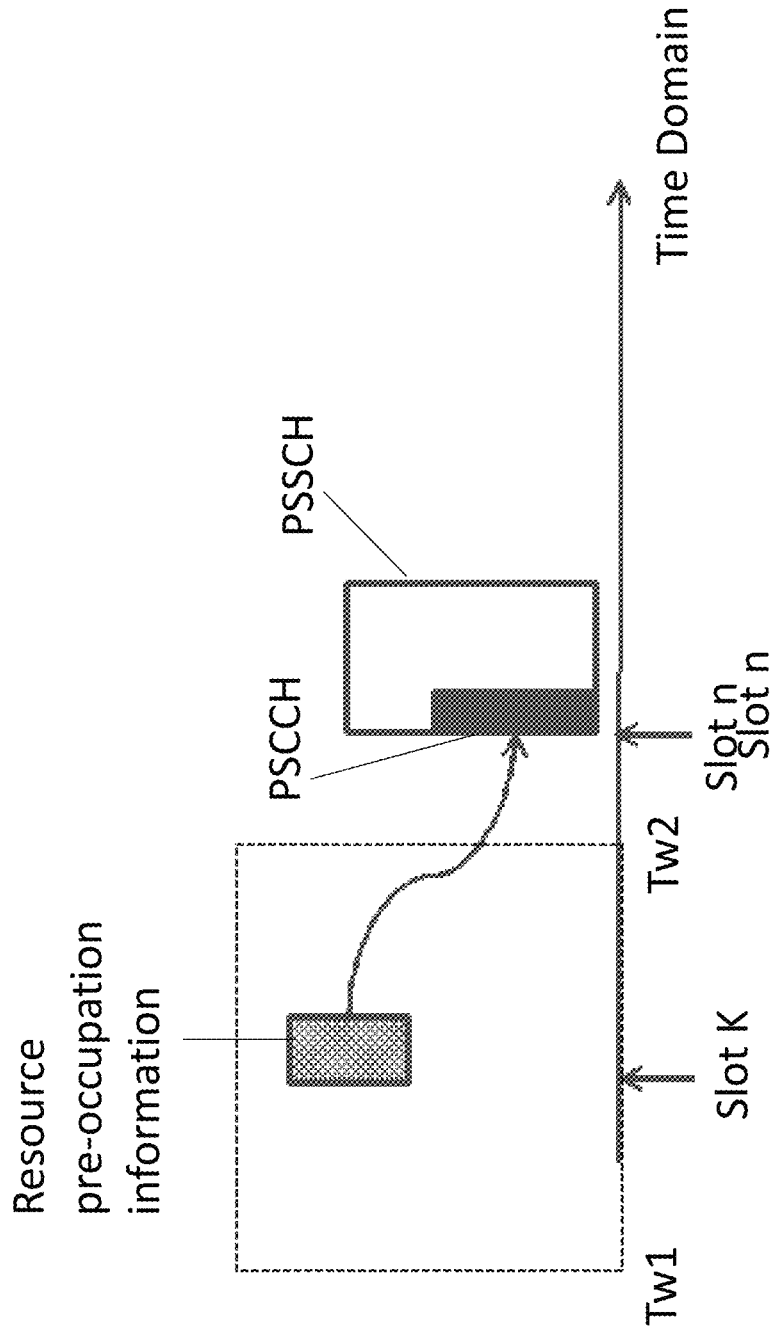
FIGS. 8 to 10 illustrate diagrams showing examples of a pre-occupied resource indication method applied to a sidelink transmission mode 2 based on some implementations of the disclosed technology.

The base station configures the UE to operate in the sidelink transmission Mode 2, and the high layer configuration signaling configures or pre-configures the resource set/resource pool to transmit the resource pre-occupation information (RPI). FIG. 8 illustrates a conceptual diagram showing an example of a pre-occupied resource indication method applied to a sidelink transmission mode 2 based on some implementations of the disclosed technology. As shown in FIG. 8, when the UE has the configured sidelink grant, the UE will send sidelink control information and/or data (PSCCH and/or PSSCH) on slot n. In this case, the resource pre-occupation information (RPI) is sent within a time window before slot n. The transmission time of the resource pre-occupation information (RPI) is slot k.

The resource pre-occupation information (RPI) includes at least one of the following:
 i) Time domain resource indication of the pre-occupied resource (time domain location). The time domain resource indication may include, for example, the deviation (n-k) slot between the time domain location of the pre-occupied resource and the transmission time of the resource pre-occupation information (RPI). In this case, the slot n is indicated as the time domain transmission location for the PSCCH/PSSCH.
 ii) Frequency domain resource indication of the pre-occupied resource (frequency domain location, size). For example, the frequency domain resource indication may include the frequency domain location of the resource used by the PSSCH/PSCCH. In some implementations, the starting RB is 5, and the number of RBs is 10.
 iii) Priority domain. For example, the priority domain is determined according to the priority of the transport block. In some implementations, the level is 3.
 iv) Time window. Time window may be referred to as a pre-occupation information transmission window, a PW window, and is determined by a start position Tw1 and an end position Tw2. In some implementations, the time unit can be or include a slot.
 v) Time domain range. Time domain range [Tw1, Tw2], or [n-X1, n-X2] of the pre-occupied information transmission window (PW window). In some implementations, values of Tw, Tw2, X1, and X2 are determined according to at least one of the following: the priority level corresponding to the data transmitted at time n; the reliability level corresponding to the data transmitted at time n; the delay requirement corresponding to the data transmitted at time n; the QoS (quality of service level, such as 5QI, VQI) level corresponding to the data transmitted at time n; or the business of the current resource pool, such as CBR (Channel Busy Ratio).

As a specific example of a scenario under Implementation 1, the following case is discussed.

It is assumed that the resource pool of the pre-occupied information for a dedicated resource is configured or pre-configured, and the resource pre-occupation information (RPI) is sent by using resources in the resource pool of the pre-occupied information. The priority level of the data is 3, and the delay (PDB, Packet Delay Budget) is 10 ms. According to the configured parameter table or rule, the number N is determined to be 1 which indicates the number of times that the pre-occupied channel is sent. The transmission window, PW window, can be set as [n-10, n-1], for example, X1=10, X2=1, or TW1=n-10, TW2=n-1.

The UE randomly selects one resource from PW window for the resource pre-occupation information (RPI) transmission, for example, slot k (slot k is in the PW window range). The UE sets the value of each field included in the foregoing pre-occupation information according to the high-level information/parameter and transmits the resource pre-occupation information (RPI) on the selected resource.

Implementation 2 (Pre-occupied Resource Indication Scheme, Mode 2)

Figure 9:
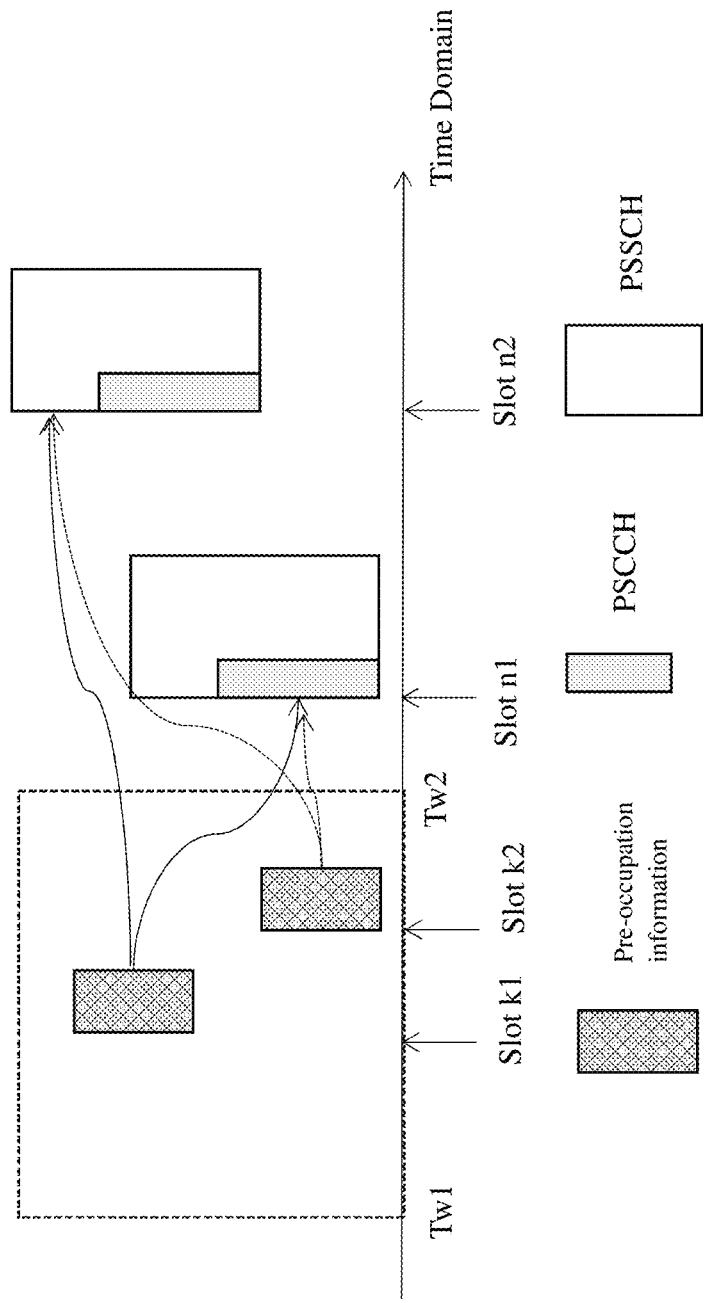

The base station configures the UE to operate in the sidelink transmission Mode 2, and the high layer configuration signaling configures or pre-configured the resource set/resource pool to transmit the resource pre-occupation information (RPI). FIG. 9 illustrates a conceptual diagram showing an example of a pre-occupied resource indication method applied to a sidelink transmission mode 2 based on some implementations of the disclosed technology. As shown in FIG. 9, unlike the Implementation 1, the pre-occupation information is sent multiple times, for example, two. The resource pre-occupation information can indicate two or more resources of PSSCH. In this example, the UE selects two resources, resource 1 and resource 2, which are indicated in the resource pre-occupation information. When the UE has the configured sidelink grant, the UE will send sidelink control information and/or data (PSCCH and/or PSSCH) on slot n1 and slot n2. In this case, the resource pre-occupation information (RPI) is transmitted in a time window before slot n1 or slot n2. The transmission of the pre-occupied resources occurs two times and the transmission time of resource pre-occupation information (RPI) is slot k1 and slot k2.

The resource pre-occupation information (RPI) includes at least one of the following:
 i) time domain resource indication of the pre-occupied resource (time domain location). For example, when indicating multiple resources of PSCCH/PSSCH, the resources are separately indicated. The time domain resource indication of the resource 1 includes a deviation (n1-k1) slot between the time domain location of the pre-occupied resource (slot n1) and the transmission time of the resource pre-occupation information (RPI) (slot k1). In this case, the time domain resource indication indicates the time domain transmission location for the corresponding PSCCH/PSSCH, which is on slot n1. The time domain resource indication of the resource 2 includes a deviation (n2-k1) slot between the time domain location of the pre-occupied resource (slot n2) and the transmission time of the resource pre-occupation information (RPI) (slot k1). In this case, the time domain resource indication indicates the time domain transmission location for the corresponding PSCCH/PSSCH, which is on slot n2.

ii) frequency domain resource indication of the pre-occupied resource (frequency domain location, size). For example, when indicating multiple resources, the resources are separately indicated. The frequency domain resource indication for resource 1 may include the resource of the frequency domain resource used by the PSCCH/PSSCH is 5. In some implementations, the number of RBs is 10.

iii) priority domain. For example, the priority domain is determined according to the priority of the transport block. In some implementations, the level is 3.

iv) time window. Time window may be referred to as a pre-occupation information transmission window, a PW window, and is determined by a start position Tw1 and an end position Tw2. In some implementations, the time unit can be or include a slot.

v) time domain range. Time domain range [Tw1, Tw2] of the pre-occupied information transmission window (PW window) is determined according to at least one of the following: the priority level corresponding to the data transmitted at time n; the reliability level corresponding to the data transmitted at time n; the delay requirement corresponding to the data transmitted at time n; the QoS (quality of service level, such as 5QI, VQI) level corresponding to the data transmitted at time n; or the busyness of the current resource pool, such as CBR (Channel Busy Ratio).

As a specific example of a scenario under Implementation 2, the following case is discussed.

In this example, the priority level of the data is 3, and the delay (PDB, Packet Delay Budget) is 10 ms. According to the configured parameter table or rule, the PW window of the pre-occupied channel is determined to be [n-10, n-1] and the number N is determined 2 which means the pre-occupied resource can be transmitted two times.

The UE selects two pre-occupied resources within the candidate pre-occupation information resource set or resource pool in the PW window. For example, the transmission time, k1 and k2, of the pre-occupation information are set to be within the PW window range, and the value of field included in pre-occupation information are set according to the high-level information/parameter setting. To indicate multiple PSCCH/PSSCH resources, the time domain and frequency domain information are indicated separately. Then, the UE sends the pre-occupation information on the selected resources corresponding to the pre-occupation information.

Implementation 3 (Pre-occupied Resource Indication Scheme, Mode 2)

Figure 10:
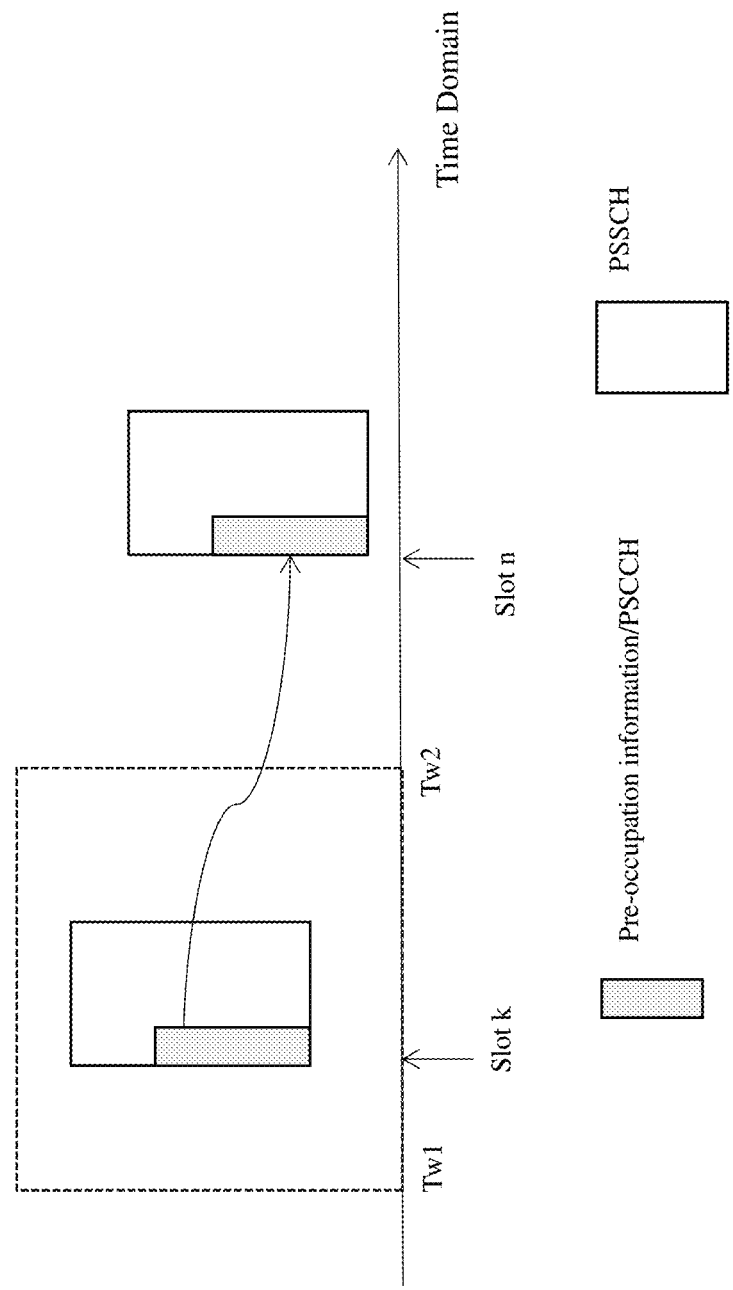
Figure 11:
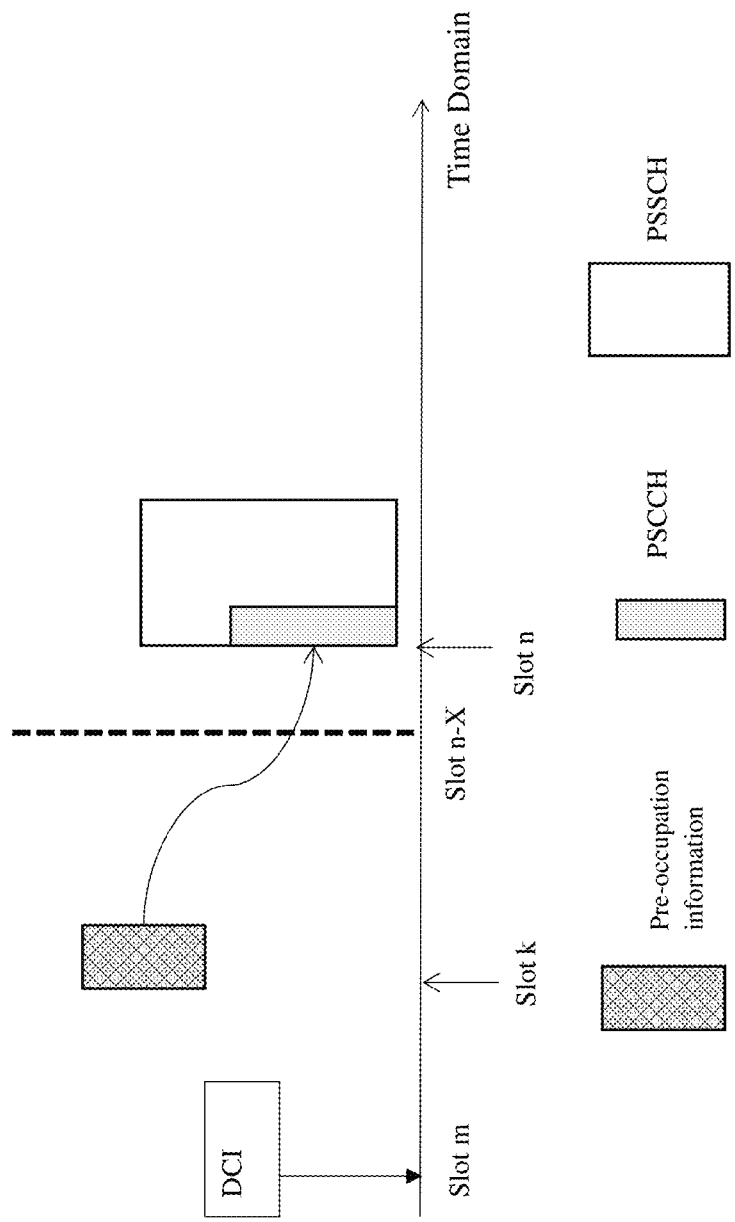
FIG. 11 illustrates a diagram showing an example of a pre-occupied resource indication method applied to a sidelink transmission mode 1 based on some implementations of the disclosed technology.

The base station configures the UE to operate in the sidelink transmission Mode 2, and the high-level configuration signaling configures or pre-configures the resource pool for the sidelink communication. FIG. 10 illustrates a conceptual diagram showing an example of a pre-occupied resource indication method applied to a sidelink transmission mode 2 based on some implementations of the disclosed technology. As shown in FIG. 10, in this implementation, the PSCCH resource set or the resource pool can also be used for the transmission of the resource pre-occupation information (RPI). When the UE has the configured sidelink grant, the UE will send sidelink control information and/or data (PSCCH and/or PSSCH) on slot n. In this case, the resource pre-occupation information (RPI) is sent within a time window before slot n. The transmission time of the resource pre-occupation information (RPI) is slot k.

The resource pre-occupation information (RPI) includes at least one of the following:

1. time domain resource indication of the pre-occupied resource (time domain location). The time domain resource indication may include, for example, the deviation 'n-k' slot of the time domain location of the pre-occupied resource and the transmission time of the resource pre-occupation information (RPI). In this case, the slot n is indicated as the time domain transmission location of the PSCCH/PSSCH.

2. frequency domain resource indication of the pre-occupied resource (frequency domain location, size). For example, the frequency domain resource indication may include the frequency domain location of the resource used by the PSSCH/PSCCH. In some implementations, the starting RB is 5, and the number of RBs is 10.

3. priority domain. For example, the priority domain is determined according to the priority of the transport block. In some implementations, the level is 3.

4. resource retransmission location information. The resource retransmission location information may indicate time domain and frequency domain location information of resources that are transmitted multiple times.

5. destination ID. The destination ID can be used to indicate who needs to receive the slot. The slot cannot be used for transmitting a pre-occupied resource while being received.

6. active or release indication. If the pre-occupied resource is to be released, the resource pre-occupation information (RPI) can be used to release the pre-occupied resource.

7. indication type information. The indication type information may indicate whether the current pre-occupation information indicates the transmission of the current PSSCH. The indication type information may include at least one of the following:

A. Indication type field. Indication type has a value of 1 bit. The value '0' indicates that the transmission of a pre-occupied resource is not associated with the PSSCH transmission and the value '1' indicates that the transmission of a pre-occupied resource is associated with the PSSCH transmission. In some implementations, the values '0' and '1' can be set in the opposite way. For example, the value '0' indicates that the transmission of a pre-occupied resource is associated with the PSSCH transmission and the value '1' indicates that the transmission of a pre-occupied resource is not associated with the PSSCH transmission.

B. Modulation and coding domain indication. A specific value is used to indicate that there is no associated PSSCH transmission; otherwise, it indicates that there is a bound PSSCH transmission.

C. Transmission indication of the pre-occupied resource. In some implementations, the implied transmission indication allows to use a different resource set or resource pool than the PSCCH or a dedicated pre-occupied resource information to send a resource pool or resource set, which indicates that there is no bound PSSCH transmission. In some implementations, the implied transmission indication allows to use a PSCCH resource or resource pool, which indicates that there is a bound PSSCH transmission.

8. time window. Time window may be referred to as a pre-occupation information transmission window, a PW window, and is determined by a start position Tw1 and an end position Tw2. In some implementations, the time unit can be or include a slot.

9. time domain range. Time domain range [Tw1, Tw2], or [n-X1, n-X2] of the pre-occupied information transmission window (PW window). In some implementations, values of Tw1, Tw2, X1, and X2 are determined according to at least one of the following: the priority level corresponding to the data transmitted at time n; the reliability level corresponding to the data transmitted at time n; the delay requirement corresponding to the data transmitted at time n; the QoS (quality of service level, such as 5QI, VQI) level corresponding to the data transmitted at time n; or the busyness of the current resource pool, such as CBR (Channel Busy Ratio).

As specific examples of scenarios under Implementation 3, the following cases are discussed.

It is assumed that the resource set or resource pool of the resource pre-occupation information (RPI) is same as or within the PSCCH resource pool. Resource pre-occupation information (RPI) can also be attached to the PSCCH information. The priority level of the data is 3, and the delay (PDB, Packet Delay Budget) is 10 ms. According to the configured parameter table or rule, the number N which indicates the number of times that the pre-occupied channel can be sent is determined. The transmission window, PW window, can be set as [n-10, n-1], for example, X1=10, X2=1, or TW1=n-10, TW2=n-1.

The UE randomly selects one resource from the resource set or resource pool of the resource pre-occupation information (RPI) that is transmitted at slot k (slot k is in the PW window range). The UE sets the value of each field included in the foregoing pre-occupation information and sends the resource pre-occupation information (RPI) on the selected resource corresponding to the pre-occupation information. The setting of the value of each field included in the pre-occupation information can be done in various manners and the following cases 1 to 4 are discussed as examples.

Case 1: The setting of the value of each field included in the foregoing pre-occupation information includes at least one of the indication type, the time domain resource indication, or the frequency domain resource indication. In some implementations, if the indication type is set to 1, it indicates that the transmission of the pre-occupied resource is associated with the PSSCH transmission. The time domain resource indication indicates the time domain location of the resource that is pre-occupied for the next transmission and the time domain location of the currently transmitted resource indicated in the resource pre-occupation information (RPI). The frequency domain resource indication of the resource indicates the frequency domain resource location of the current PSSCH and the frequency domain resource location pre-occupied for the next transmission.

Case 2: The setting of the value of each field included in the foregoing pre-occupation information includes at least one of the indication type, the time domain resource indication, or the frequency domain resource indication. If the type indication is set to 0, it indicates that the transmission of the pre-occupied resource is not associated with the PSSCH transmission. The time domain resource indication indicates the time domain location of the resource that is pre-occupied for the next transmission. The frequency domain resource indication of the resource indicates the frequency domain location of the resource that is pre-occupied for the next transmission.

Case 3: The setting of the value of each field included in the foregoing pre-occupation information includes at least one of the modulation and coding indication, the time domain resource indication, or the frequency domain resource indication. One specific value of the modulation and coding indication indicates that the transmission of the pre-occupied resource is not associated with the PSSCH transmission. The time domain resource indication indicates the time domain location of the resource that is pre-occupied for the next transmission. The frequency domain resource indication of the resource indicates the location of the pre-occupied frequency domain resource for the next transmission.

Case 4: The time domain resource indication infers an index value of the time domain offset between the resource pre-occupied information location and the pre-occupied resource location. The index value is determined by the following table:

TABLE 1

| Index value | Time domain deviation offset value (unit: slot/ms) |
| --- | --- |
| 0 | 0 |
| 1 | 1 |
| 2 | 2 |
| ... | ... |
| 15 | 15 |
| 16 | 100 |
| 17 | 200 |
| ... | ... |

Implementation 4 (Pre-occupied Resource Indication Scheme, Mode 1)

The base station configures the UE to operate in the sidelink transmission Mode 1, and the high layer configuration signaling configures a resource set/resource pool for resource preemption information transmission. FIG. 10 illustrates a conceptual diagram showing an example of a pre-occupied resource indication method applied to a sidelink transmission mode 1 based on some implementations of the disclosed technology. As shown in FIG. 10, the UE receives the DCI indicated by the base station at slot m, and determines to transmit sidelink control and/or data (PSCCH and/or PSSCH) at slot n. The resource pre-occupation information (RPI) is transmitted before slot n. Transmitting the resource pre-occupation information (RPI) before the slot n means that the transmission time k of the pre-occupation information is before the slot (n-X), wherein X is an integer not less than 0. X may have a predefined value. In some implementations, the value X may be determined by at least one of the following: the moment m when the UE receives the DCI, the priority level indicated by the DCI, the reliability level indicated by the DCI, the delay request indicated by DCI, the QoS (quality of service level, such as 5QI, VQI) level indicated by the DCI, or the busyness of the current resource pool, such as CBR. The time unit can be or include a slot, a sub-frame, a symbol, or an aggregated slot unit. The transmission time of the resource pre-occupation information (RPI) is slot k.

The resource pre-occupation information (RPI) includes at least one of the following:
  i) time domain resource indication of the pre-occupied resource (time domain location). For example, the time domain resource indication may include the deviation 'n-k' slot between the time domain location of the pre-occupied resource and the transmission time of the resource pre-occupation information (RPI). In this case, the slot n is indicated as the time domain transmission location for the PSCCH/PSSCH.
  ii) frequency domain resource indication of the pre-occupied resource (frequency domain location, size). For example, the frequency domain resource indication may include the frequency domain location of the resource used by the PSSCH/PSCCH. In some implementations, the starting RB is 5, and the number of RBs is 10.
  iii) QoS domain. This QoS domain is determined according to the QoS parameters (such as 5QI, VQI, etc.) corresponding to the transport block. In some implementations, the QoS class is assumed to be 9;
  As a specific example of a scenario under Implementation 4, the following case is discussed.

The QoS parameter (VQI) of the data is 9 and the delay (PDB, Packet Delay Budget) is 10 ms. According to the configured parameter table or rule, the transmission deadline of the pre-occupied channel is determined to be slot (n-4). The number N indicates the number of times that the pre-occupied channel is sent. In this example, N is set to 1. N can also be predefined or configured by higher layer signaling. The UE randomly selects one resource from the dedicated resource set of the resource pre-occupation information (RPI) that is transmitted in the PW window. For example, the time domain is slot 'n-5,' the frequency domain is PRB 20, and the value of field included in resource pre-occupation information (RPI) is set according to the DCI indication or high-level information, and resource pre-occupation information (RPI) is sent on the selected resources corresponding to the pre-occupation information. In another example, N is set to 0, which means the UE can send its PSCCH/PSSCH without pre-occupation information (RPI) transmission.

Implementation 5 (Resource Selection Method—Pre-configuration Parameters)

Figure 12:
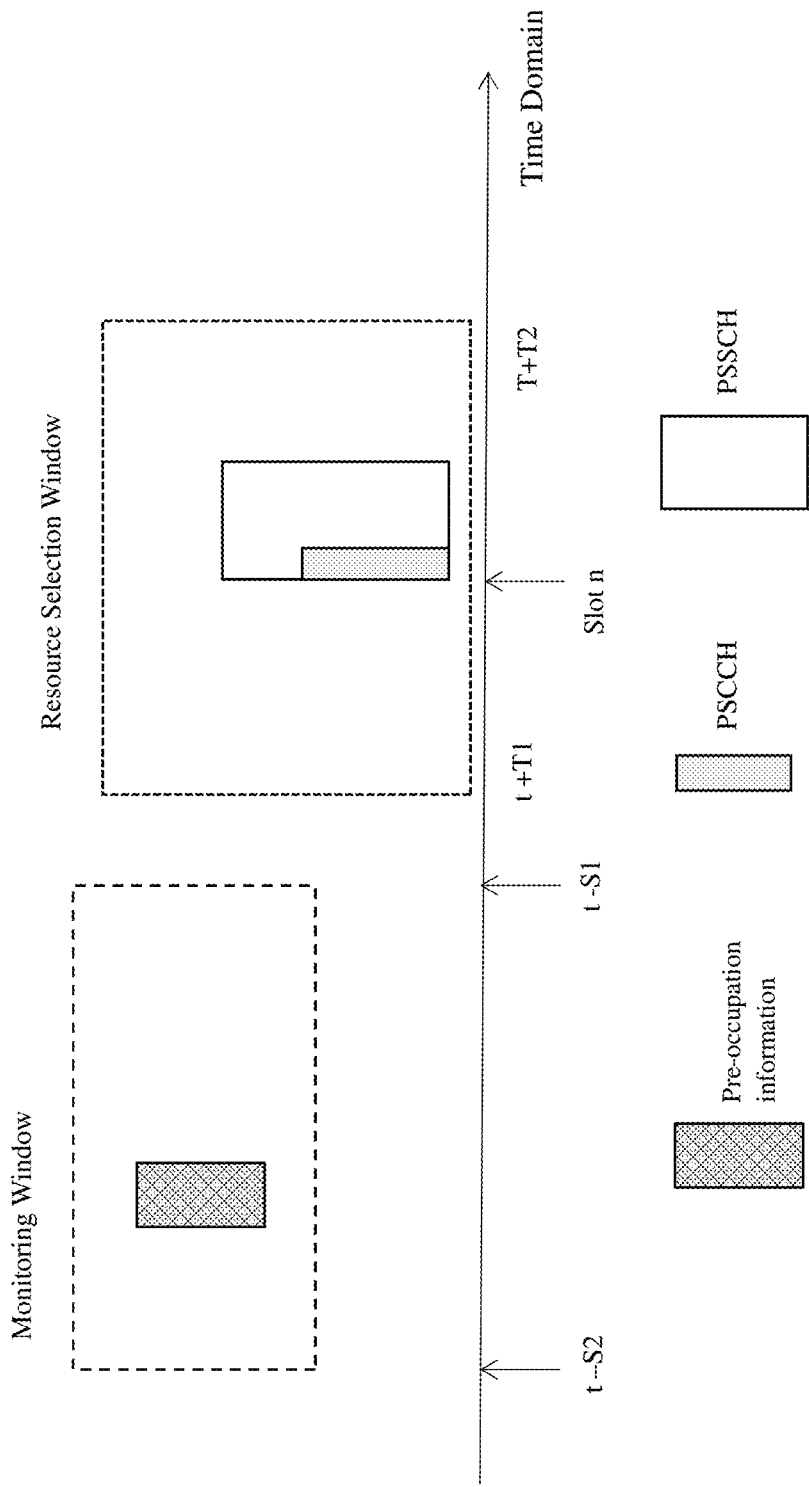
FIG. 12 illustrate a diagram showing an example of a resource selection method based on some implementations of the disclosed technology.

FIG. 12 illustrate a diagram showing an example of a resource selection method based on some implementations of the disclosed technology. If the upper layer requests the measurement/perception result at time t, for the transmission of the PSCCH/PSSCH, at least one of the following operations need to be performed in each resource pool:
  1. The UE may determine a resource selection window RW with a range such as [t+T1, t+T2]. All resources in the RW are used as candidate resources C-set, and the number of resource units included in the RW is N.
  2. The UE may receive pre-occupied resource indication information sent by another UE(s) and/or control information carrying resource pre-occupation information (RPI). The received information may be decoded by the UE. The resource usage is counted during a monitoring window SW. The resource that has been pre-occupied and/or indicated as the resources to be used by the pre-occupied resource indication information and/or the control information carrying the resource pre-occupied information is excluded from the C-set and is collected in an O-Set. The excluding of a particular resource from the C-set can be carried out in other ways. For example, the resource can be excluded from the C-set when there is an overlap between a resource pre-occupied by another user device and a resource to be used by the user device, excluding the resource from the candidate resource set. In some implementations, the resource is excluded from the C-set when there is an overlap between the resource pre-occupied by another user device and the resource to be used by the user device, and a priority level or a QoS parameter level indicated for another user device is higher than that for the user device. In some implementations, when there is an overlap between the resource pre-occupied by another user device and the resource to be used by the user device, and the priority level or the QoS parameter level indicated for another user device is equal to the user device, excluding the resource from the candidate resource set whose power (RSRP, Reference Signal Received Power) or signal strength (RSSI, Received Signal Strength Indicator) of the resource pre-occupation information (RPI) is higher than a threshold. In some implementations, when there is the resource pre-occupied by another user device and a destination ID in its resource pre-occupation information (RPI) is for the user device, excluding the resource on a same time domain of the pre-occupied resource from the candidate resource set.
  3. The remaining resources are treated as selectable resources S-Set.
  4. The UE may check whether the resources in the S-Set meet the minimum resource requirement. For example, the minimum resource quantity ratio P is 10%.
  5. If the resource in the S-Set is less than the minimum resource quantity requirement (floor(N*P) or ceil (N*P)), the resource elements in the used resource O-set are sorted from low priority to high priority. When the priorities are the same, the energy corresponding to the pre-occupied signals is sorted from small to large. The resources that meet the condition's lowest priority and/or minimum energy are sequentially moved into the S-Set until the S-set meets the minimum number requirement. The satisfaction condition is that the priority level is lower than the priority level corresponding to the PSSCH.
  6. If the minimum resource quantity requirement is still not met, the UE reports no available resources to the upper layer.
  7. If the minimum resource quantity requirement is met, the S-Set resource that is required by the number threshold is reported to the upper layer to the upper layer.

The resource selection window RW may be set such as [t+T1, t+T2], where T1 and T2 are integers greater than or equal to 0, and the range limits of T1mini (T1>T1mini) and T2max (T2<T2max) need to be met. The specific value can be determined by the UE. In some implementations, T1mini can be predefined or determined based on priority levels or QoS parameters. In some implementations, T2max can be predefined, or limited by the maximum latency requirement, or based on priority levels or QoS parameters. In the example, T1mini is predefined as 4, and T2max is predefined as 100. For example, the UE can select an alternate available resource in the range of slot range [n+4, n+100] in the PSCCH/PSSCH resource pool. The alternative available resources need to meet the latency requirements.

The monitoring window SW may be set such as [t-S1, t-S2], where S1 and S2 are integers greater than or equal to 0, and the range limits of S1max (S1<=S1max) and S2mini (S2>S2mini) need to be satisfied. The specific value can be determined by the UE. The S1max can be predefined or determined based on priority levels or QoS parameters. S2mini can be predefined or determined based on priority levels or QoS parameters. In the example, S1max is predefined as 100, and S2mini is predefined as 0. That is the UE needs to measure or sensing pre-occupied information in the range of time window [t-100, t] and in the resource set/resource pool.

The time domain resource described above may have a time domain resource granularity of a slot, a subframe, a symbol, or an aggregated slot unit. The time relationship may be mapped on a physical time unit or only on a logical time unit.

Implementation 6 (Resource Selection Method—Parameters Determined Based on QoS Parameters)

If the upper layer (for example, other layers above the physics layer) requests to report the measurement/sensing result at time t, the transmission for PSCCH/PSSCH needs to perform the following operations in a resource pool:
1. The UE may determine a resource selection window RW with a range such as [t+T1, t+T2]. All resources in the RW are used as candidate resources in C-set. For example, the number of resource units included is N.
2. The UE may receive, from another UE(s), pre-occupied resource indication information and/or control information carrying pre-occupation information. The received information may be decoded by the UE. The resource usage is counted during a monitoring window SW. The pre-occupied resource indication information and/or control information can provide information on the resource that has been pre-occupied by another UE and/or the resource to be used by the UE. The resource indicated by the received information as one that has been pre-occupied is excluded from the C-set and collected in an O-Set. The excluding of a particular resource from the C-set can be carried out in other ways. For example, the resource can be excluded from the C-set when there is an overlap between a resource pre-occupied by another user device and a resource to be used by the user device, excluding the resource from the candidate resource set. In some implementations, the resource is excluded from the C-set when there is an overlap between the resource pre-occupied by another user device and the resource to be used by the user device, and a priority level or a QoS parameter level indicated for another user device is higher than that for the user device. In some implementations, when there is an overlap between the resource pre-occupied by another user device and the resource to be used by the user device, and the priority level or the QoS parameter level indicated for another user device is equal to the user device, excluding the resource from the candidate resource set whose power (RSRP, Reference Signal Received Power) or signal strength (RSSI, Received Signal Strength Indicator) of the resource pre-occupation information (RPI) is higher than a threshold. In some implementations, when there is the resource pre-occupied by another user device and a destination ID in its resource pre-occupation information (RPI) is for the user device, excluding the resource on a same time domain of the pre-occupied resource from the candidate resource set.
3. The remaining resources are treated as selectable resources S-Set.
4. The UE may check whether resources in the S-Set meet the minimum resource requirement. For example, the minimum resource quantity ratio P is 10%.
5. If the resource in the S-Set is less than the minimum resource quantity requirement (floor(N*P) or ceil (N*P)), the resource elements in the used resource O-set are in descending order of QoS parameters. When sorting and QoS requirements are the same, the energy corresponding to the pre-occupied signals is sorted from small to large. The resources that meet the condition's lowest priority and/or minimum energy are sequentially moved into the S-Set until the S-set meets the minimum number requirement. The condition is that the QoS parameter requirement level is lower than the QoS level corresponding to the PSSCH.
6. If the minimum resource quantity requirement is still not met, the UE may report no available resources to the upper layer.
7. If the minimum resource quantity requirement is met, the S-Set resource that is required by the number threshold is reported to the upper layer to the upper layer.

The resource selection window RW is set, for example, as [t+T1, t+T2], where T1 and T2 are integers greater than or equal to 0, and the range limits of T1mini (T1>T1mini) and T2max (T2<T2max) need to be met. The specific value can be determined by the UE. T1mini can be predefined or determined based on priority levels or QoS parameters. T2max can be predefined, or limited by the maximum latency requirement, or based on priority levels or QoS parameters.

The monitoring window SW is set, for example, as [t-S1, t-S2], where S1 and S2 are integers greater than or equal to 0. The range limits of S1maxmimum (S1max, S1≤S1max) and S2minimum (S2mini, S2>S2mini) need to be satisfied. S1max can be predefined or determined based on priority levels or QoS parameters. S2mini can be predefined or determined based on priority levels or QoS parameters. For example, the higher QoS parameter level indicates the higher QoS requirements corresponding to its data, such as higher priority level, smaller delay requirements, higher reliability requirements, or greater communication range requirements.

In a specific example, T1mini obtains a value of 10 according to the QoS parameter lookup table, and T2max obtains a value of 50 according to the QoS parameter lookup table. That is, the UE can select the range in the range of the slot range [n+10, n+50] in the PSCCH/PSSCH resource pool. Selected available resources. The alternative available resources need to meet the latency requirements of their PSSCH transmission. The S1max obtains a value of 100 according to the QoS parameter lookup table, and S2mini is predefined to be 0. In this case, the UE needs to measure or perceive the resource set/resource pool of the pre-occupied information in the time window [t-100, t]. The time domain resource described above may have a time domain resource granularity of a slot, a subframe, a symbol, or an aggregated slot unit. The time relationship may be mapped on a physical time unit or only on a logical time unit.

Example 7 (Resource Selection Method—Simplified Scheme)

If the upper layer requests the measurement/perception result at a time t for the transmission of the PSCCH/PSSCH, at least one of the following operations may be performed in each resource pool:
1. The UE may determine a resource selection window RW with a range such as [t+T1, t+T2]. All resources in the RW are used as candidate resources C-set, and the number of resource units included in the RW is N.
2. The UE may receive and decode pre-occupied resource indication information sent by other UEs and/or control information carrying pre-occupation information. The resource usage is counted until the deadline Th. The resource that has been pre-occupied and/or indicated as the resources to be used by the pre-occupied resource indication information and/or the control information carrying the resource pre-occupied information is excluded from the C-set and is collected in an O-Set. The excluding of a particular resource from the C-set can be carried out in other ways. For example, the resource can be excluded from the C-set when there is an overlap between a resource pre-occupied by another user device and a resource to be used by the user device, excluding the resource from the candidate resource set. In some implementations, the resource is excluded from the C-set when there is an overlap between the resource pre-occupied by another user device and the resource to be used by the user device, and a priority level or a QoS parameter level indicated for another user device is higher than that for the user device. In some implementations, when there is an overlap between the resource pre-occupied by another user device and the resource to be used by the user device, and the priority level or the QoS parameter level indicated for another user device is equal to the user device, excluding the resource from the candidate resource set whose power (RSRP, Reference Signal Received Power) or signal strength (RSSI, Received Signal Strength Indicator) of the resource pre-occupation information (RPI) is higher than a threshold. In some implementations, when there is the resource pre-occupied by another user device and a destination ID in its resource pre-occupation information (RPI) is for the user device, excluding the resource on a same time domain of the pre-occupied resource from the candidate resource set.
3. The remaining resources are treated as selectable resources S-Set.
4. The UE may check whether the resources in the S-Set meet the minimum resource requirement. For example, the minimum resource quantity ratio P is 10%.
5. If the minimum resource quantity requirement is not met, the UE reports no available resources to the upper layer.
6. If the minimum resource quantity requirement is met, the S-Set resource that is required by the number threshold is reported to the upper layer.

The cutoff time Th, such as slot 't-S', where S is an integer greater than or equal to 0, needs to satisfy the range limit of Smini. The specific value can be determined by the UE. The S1mini can be predefined or determined based on priority levels or QoS parameters. S>Smini.

Implementation 8 (Resource Selection Method)

The method for the UE to listen/perceive the pre-occupied resource indication information sent by another UE(s) to perform the PSCCH/PSSCH resource selection includes at least one of the following:
1. The UE may receive and decode the pre-occupied resource indication information sent by another UE(s) and/or control information carrying the pre-occupation information. The resource usage may be counted in a monitoring window SW. The monitoring window SW is set, for example, as [t-S1, t-S2], where S1 and S2 are integers greater than or equal to 0. The range limits of S1maxmimum (S1max, S1<S1max) and S2minimum (S2mini, S2>S2mini) need to be satisfied. The specific values of S1 and S2 can be determined by the UE. S1max can be predefined or determined based on priority levels or QoS parameters. S2mini can be predefined or determined based on priority levels or QoS parameters. For example, the higher QoS parameter level indicates the higher QoS requirements corresponding to its data, such as higher priority level, smaller delay requirements, higher reliability requirements, or greater communication range requirements.
2. The UE may receive and decode the pre-occupied resource indication information sent by another UE(s) and/or control information carrying pre-occupation information. The resource usage may be counted until the cutoff time Th. The cutoff time Th, such as slot (t-S), where S is an integer greater than or equal to 0, needs to satisfy the range limit of Smini. The specific value can be determined by the UE. The S1mini can be predefined or determined based on priority levels or QoS parameters. S>Smini.
3. The resource that has been indicated as used in the pre-occupied resource indication information and/or the control information carrying the pre-occupied information may be excluded from the C-set.
4. The resource may be excluded from the C-set if i) the resource has been indicated as used in the pre-occupied resource indication information and/or the control information carrying the pre-occupied information and indicates the used resource and ii) the priority level or QoS parameter level corresponding to the resource is higher or lower than that of the UE.

For example, the higher QoS parameter level indicates the higher QoS requirements corresponding to its data, such as higher priority level, smaller delay requirements, higher reliability requirements, or greater communication range requirements.

In some implementations, the resource selection method may include the resource reselection scheme 1. In the resource reselection scheme 1, the UE may receive and decode the pre-occupied resource indication information sent by another UE(s) and/or control information carrying the pre-occupation information. If there is an overlap between a resource pre-occupied by another UE(s) and a resource to be used by the UE, the priority levels or QoS parameter levels of the two are compared. If the priority of another UE is higher than the priority indicated for the UE by the resource pre-occupation information (RPI) and/or control information, the resource reselection is triggered. In this case, the UE reselects a new resource for the transmission. If the priority indicated by another UE is not higher than the priority indicated for the UE by the resource pre-occupation information (RPI) and/or control information, the transmission of the pre-occupied resource is continued.

In some implementations, the resource selection method may include the resource reselection scheme 2. In the resource reselection scheme 2, the UE may receive and decode the pre-occupied resource indication information sent by another UE(s) and/or control information carrying pre-occupation information. If there is an overlap between a resource pre-occupied by another UE(s) and the resource to be used by the UE, the resource reselection is triggered. In this case, the UE reselects a new resource for the transmission.

In some implementations, the resource selection method may include the resource reselection scheme 3. In the resource reselection scheme 3, the UE may receive and decode pre-occupied resource indication information sent by another UEs and/or control information carrying pre-occupation information. If i) there is an overlap between a resource pre-occupied by another UE(s) and the resource to be used by the UE and ii) the CBR of the current resource pool is lower than the preset or configured threshold, the resource reselection is triggered to reselect a new resource for the transmission. If the CBR of the current resource pool is not lower than the preset or configured threshold, the priority level or QoS parameter level of the two overlapping resources is compared. If the comparison shows that the priority of another UE(s) is higher than the priority of the UE which is indicated by the resource pre-occupation information (RPI) and/or control information, the resource reselection is triggered. In this case, the UE reselects a new resource for the transmission. If the comparison shows that the priority of another UE(s) is not higher than the priority of the UE which is indicated by the resource pre-occupation information (RPI) and/or control information, the transmission of the pre-occupied resource is continued.

Additional features and embodiments the above-described methods/techniques discussed above are described below using a clause-based description format.

1. A wireless communication method including: performing, by a first device, a first communication of a resource pre-occupation information (RPI) with a second device using a dedicated resource pre-occupied channel or control channel, and wherein when a pre-occupied resource is transmitted at a time 'n,' the first communication is performed i) before a time 'n-X,' wherein X is an integer not less than 0, or ii) during a time window ending before the time 'n.'
2. The wireless communication method of clause 1, wherein the control channel includes a physical sidelink control channel (PSCCH).
3. The wireless communication method of clause 1, wherein the resource pre-occupation information (RPI) includes at least one of a time domain resource indication, a frequency domain resource indication, a priority indication, a QoS parameter indication, resource location retransmission information, indication type information, destination ID, or active or release indication.
4. The wireless communication method of clause 3, wherein the time domain resource indication includes at least one of a time domain location of a resource that is pre-occupied for a next transmission or an index value of a time domain deviation between locations of the resource pre-occupation information (RPI) and the pre-occupied resource.
5. The wireless communication method of clause 3, wherein the frequency domain resource indication includes a frequency domain location of a resource that is pre-occupied for a current transmission or a next transmission.
6. The wireless communication method of clause 3, wherein the indication type information includes i) an indication type field, ii) a specific value of a modulation and coding field, or iii) a type of a resource pool or a resource set for a transmission of a pre-occupied resource.
7. The wireless communication method of clause 3, wherein the indication type information indicates i) format 1 that a transmission of a pre-occupied resource is not associated with a PSSCH (Physical Sidelink Shared Channel) transmission; or ii) format 2 that the transmission of the pre-occupied resource is associated with the PSSCH transmission.
8. The wireless communication method of clause 1, wherein X has a predefined value determined based on at least one of: i) a priority level of the data, ii) a reliability level of the data, iii) a delay requirement of the data, iv) a QoS (Quality of Service) level of the data, or v) a busyness of a current resource pool.
9. The wireless communication method of clause 1, wherein the time window has a time domain range determined based on at least one of: i) a priority level of the data, ii) a reliability level of the data, iii) a delay requirement of the data, iv) a QoS (Quality of Service) level of the data, or v) a busyness of a current resource pool.
10. The wireless communication method of clause 1, wherein the performing the first communication includes at least one of i) selecting N resources before the time 'n-X' for transmitting the resource pre-occupation information (RPI), or ii) selecting N resources in the time window for transmitting the resource pre-occupation information (RPI), N being an integer not less than 0 and indicating the number of times that the resource pre-occupation information (RPI) is transmitted.
11. The wireless communication method of clause 9, wherein the selecting N resources is performed according to a predefined pattern or rule that is determined based on at least one of i) a correspondence between the number N and a priority level or a QoS parameter, or ii) a correspondence among a the time 'n-X,' a time domain range [Tw1, Tw2] of the time window, and the priority level or the QoS parameter.
12. The wireless communication method of clause 1, further comprising performing, by the first device, a second communication after the first communication, wherein the resource pre-occupation information (RPI) conveyed in the first communication indicates a transmission resource for the second communication.
13. The wireless communication method of clause 1, wherein the first communication is performed in a time domain granularity of a slot, a sub-frame, a symbol, or an aggregated slot unit.
14. The wireless communication method of clause 1, wherein the first device includes a user device and the second device includes another user device.
15. A wireless communication method including: receiving, by a user device, at least one of a pre-occupied resource indication information or control information that includes resource pre-occupation information (RPI); and monitoring, by the user device, the resource pre-occupation information (RPI) during a monitoring window to obtain a usage of a resource indicated in the resource pre-occupation information (RPI).

16. The wireless communication method of clause 15, wherein the monitoring window has a time domain range [t-S1, t-S2], wherein S1 and S2 are integers greater than or equal to 0 and a maximum value of S1 and a minimum value S2 are determined based on at least one of a priority level or a QoS parameter.

17. The wireless communication method of clause 15, further comprising: triggering a resource reselection based on at least one of whether there is an overlap between a resource pre-occupied by another user device and a resource to be used by the user device, whether a busyness of a current resource pool is lower than a preset or configured threshold, or whether a priority level or a QoS parameter level indicated for another user device is higher than that for the user device.

18. The wireless communication method of clause 15, further comprising at least one of: determining, by the user device, a resource selection window to configure a candidate resource set with a configured granularity; forming, by the user device, a selectable resource set based on the monitoring; or reporting, by the user device, a final selectable resource set that is determined based on a resource requirement.

19. The wireless communication method of clause 18, wherein the resource selection window has a time domain range [t+T1, t+T2], wherein T1 and T2 are integers greater than or equal to 0 and a minimum value of T1 and a maximum value T2 are determined based on at least one of a priority level, a QoS parameter, or a latency requirement.

20. The wireless communication method of clause 18, wherein forming the selectable resource set includes at least one of: i) when there is an overlap between a resource pre-occupied by another user device and a resource to be used by the user device, excluding the resource from the candidate resource set; ii) when there is an overlap between the resource pre-occupied by another user device and the resource to be used by the user device, and a priority level or a QoS parameter level indicated for another user device is higher than that for the user device, excluding the resource from the candidate resource set; iii) when there is an overlap between the resource pre-occupied by another user device and the resource to be used by the user device, and the priority level or the QoS parameter level indicated for another user device is equal to the user device, excluding the resource from the candidate resource set whose power (RSRP, Reference Signal Received Power) or signal strength (RSSI, Received Signal Strength Indicator) of the resource pre-occupation information (RPI) is higher than a threshold; or iv) when there is the resource pre-occupied by another user device and a destination ID in its resource pre-occupation information (RPI) is for the user device, excluding the resource on a same time domain of the pre-occupied resource from the candidate resource set.

21. A wireless communications apparatus comprising a processor and a memory, wherein the processor is configured to read code from the memory and implement a method recited in any of clauses 1 to 20.

22. A computer program product comprising a computer-readable program medium code stored thereupon, the code, when executed by a processor, causing the processor to implement a method recited in any of clauses 1 to 20.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method including:
    performing, by a first device, a first communication of a resource pre-occupation information (RPI) with a second device using a dedicated resource pre-occupied channel or control channel, the resource pre-occupation information (RPI) including an indication type field having 1-bit that is either a first value indicating format 1 that a transmission of a pre-occupied resource is not associated with a PSSCH (Physical Sidelink Shared Channel) transmission, or a second value indicating format 2 that the transmission of the pre-occupied resource is associated with the PSSCH transmission, and
    performing, by the first device, a second communication of the PSSCH transmission after the first communication, wherein a transmission resource for the second communication is indicated in the resource pre-occupation information (RPI) conveyed in the first communication,
    wherein when the pre-occupied resource is transmitted at a time 'n,' the first communication is performed i) before a time 'n-X,' wherein X is an integer not less than 0, or ii) during a time window ending before the time 'n'.

2. The wireless communication method of claim 1, wherein the control channel includes a physical sidelink control channel (PSCCH).

3. The wireless communication method of claim 1, wherein the resource pre-occupation information (RPI) further includes at least one of a time domain resource indication, a frequency domain resource indication, a priority indication, a QoS parameter indication, resource location retransmission information, indication type information, destination ID, or active or release indication.

4. The wireless communication method of claim 3, wherein the time domain resource indication includes at least one of a time domain location of a resource that is pre-occupied for a next transmission or an index value of a time domain deviation between locations of the resource pre-occupation information (RPI) and the pre-occupied resource.

5. The wireless communication method of claim 3, wherein the frequency domain resource indication includes a frequency domain location of a resource that is pre-occupied for a current transmission or a next transmission.

6. The wireless communication method of claim 3, wherein the indication type information includes i) a specific value of a modulation and coding field, or ii) a type of a resource pool or a resource set for a transmission of a pre-occupied resource.

7. The wireless communication method of claim 1, wherein X has a predefined value determined based on at least one of: i) a priority level of data, ii) a reliability level of the data, iii) a delay requirement of the data, iv) a QoS (Quality of Service) level of the data, or v) a busyness of a current resource pool.

8. The wireless communication method of claim 1, wherein the time window has a time domain range determined based on at least one of: i) a priority level of data, ii) a reliability level of the data, iii) a delay requirement of the data, iv) a QoS (Quality of Service) level of the data, or v) a busyness of a current resource pool.

9. The wireless communication method of claim 1, wherein the performing the first communication includes at least one of i) selecting N resources before the time 'n-X' for transmitting the resource pre-occupation information (RPI), or ii) selecting N resources in the time window for transmitting the resource pre-occupation information (RPI), N being an integer not less than 0 and indicating the number of times that the resource pre-occupation information (RPI) is transmitted.

10. The wireless communication method of claim 9, wherein the selecting N resources is performed according to a predefined pattern or rule that is determined based on at least one of i) a correspondence between the number N and a priority level or a QoS parameter, or ii) a correspondence among a the time 'n-X,' a time domain range [Tw1, Tw2] of the time window, and the priority level or the QoS parameter.

11. The wireless communication method of claim 1, wherein the first communication is performed in a time domain granularity of a slot, a sub-frame, a symbol, or an aggregated slot unit.

12. The wireless communication method of claim 1, wherein the first device includes a user device and the second device includes another user device.

13. A wireless communication method including:
    determining, by a user device, a resource selection window to configure a candidate resource set with a configured granularity, the candidate resource set including resources in the resource selection window as candidate resources for forming a selectable resource set;
    receiving, by the user device, at least one of a pre-occupied resource indication information or control information that includes resource pre-occupation information (RPI); and
    monitoring, by the user device, the resource pre-occupation information (RPI) during a monitoring window to obtain a usage of a resource indicated in the resource pre-occupation information (RPI), the selectable resource set formed based on the monitoring by excluding at least one of the candidate resources; and
    triggering a resource reselection based on at least one of whether there is an overlap between a resource pre-occupied by another user device and a resource to be used by the user device, or whether a priority level or a QoS parameter level indicated for another user device is higher than that for the user device,
    wherein the resource selection window has a time domain range [t+T1, t+T2], and wherein T1 and T2 are integers greater than or equal to 0 and a minimum value of T1 and a maximum value T2 are determined based on at least one of a priority level, a QoS parameter, or a latency requirement.

14. The wireless communication method of claim 13, wherein the monitoring window has a time domain range [t-S1, t-S2], wherein S1 and S2 are integers greater than or equal to 0 and a maximum value of S1 and a minimum value S2 are determined based on at least one of a priority level or a QoS parameter.

15. The wireless communication method of claim 13, wherein the triggering of the resource reselection is further based on whether a busyness of a current resource pool is lower than a preset or configured threshold.

16. The wireless communication method of claim 13, further comprising
reporting, by the user device, a final selectable resource set that is determined based on a resource requirement.

17. The wireless communication method of claim 16, wherein forming the selectable resource set includes at least one of:
i) when there is an overlap between a resource pre-occupied by another user device and a resource to be used by the user device, excluding the resource from the candidate resource set;
ii) when there is an overlap between the resource pre-occupied by another user device and the resource to be used by the user device, and a priority level or a QoS parameter level indicated for another user device is higher than that for the user device, excluding the resource from the candidate resource set;
iii) when there is an overlap between the resource pre-occupied by another user device and the resource to be used by the user device, and the priority level or the QoS parameter level indicated for another user device is equal to the user device, excluding the resource from the candidate resource set whose power (RSRP, Reference Signal Received Power) or signal strength (RSSI, Received Signal Strength Indicator) of the resource pre-occupation information (RPI) is higher than a threshold; or
iv) when there is the resource pre-occupied by another user device and a destination ID in its resource pre-occupation information (RPI) is for the user device, excluding the resource on a same time domain of the pre-occupied resource from the candidate resource set.

18. A wireless communications apparatus comprising a processor and a memory, wherein the processor is configured to read code from the memory and implement a method comprising:
performing, by a first device, a first communication of a resource pre-occupation information (RPI) with a second device using a dedicated resource pre-occupied channel or control channel, the resource pre-occupation information (RPI) including an indication type field having 1-bit that is either a first value indicating format 1 that a transmission of a pre-occupied resource is not associated with a PSSCH (Physical Sidelink Shared Channel) transmission, or a second value indicating format 2 that the transmission of the pre-occupied resource is associated with the PSSCH transmission, and
performing, by the first device, a second communication of the PSSCH transmission after the first communication, wherein a transmission resource for the second communication is indicated in the resource pre-occupation information (RPI) conveyed in the first communication,
wherein when a pre-occupied resource is transmitted at a time 'n,' the first communication is performed i) before a time 'n-X,' wherein X is an integer not less than 0, or ii) during a time window ending before the time 'n'.

19. The wireless communications apparatus of claim 18, wherein the resource pre-occupation information (RPI) further includes at least one of a time domain resource indication, a frequency domain resource indication, a priority indication, a QoS parameter indication, resource location retransmission information, indication type information, destination ID, or active or release indication.

20. A non-transitory computer readable storage medium storing instructions that when executed by a processor, cause the processor to implement a method comprising:
performing, by a first device, a first communication of a resource pre-occupation information (RPI) with a second device using a dedicated resource pre-occupied channel or control channel, the resource pre-occupation information (RPI) including an indication type field having 1-bit that is either a first value indicating format 1 that a transmission of a pre-occupied resource is not associated with a PSSCH (Physical Sidelink Shared Channel) transmission, or a second value indicating format 2 that the transmission of the pre-occupied resource is associated with the PSSCH transmission, and
performing, by the first device, a second communication of the PSSCH transmission after the first communication, wherein a transmission resource for the second communication is indicated in the resource pre-occupation information (RPI) conveyed in the first communication,
wherein when a pre-occupied resource is transmitted at a time 'n,' the first communication is performed i) before a time 'n-X,' wherein X is an integer not less than 0, or ii) during a time window ending before the time 'n'.

21. The non-transitory computer readable storage medium of claim 20, wherein the resource pre-occupation information (RPI) further includes at least one of a time domain resource indication, a frequency domain resource indication, a priority indication, a QoS parameter indication, resource location retransmission information, indication type information, destination ID, or active or release indication.

* * * * *